Figure 1:
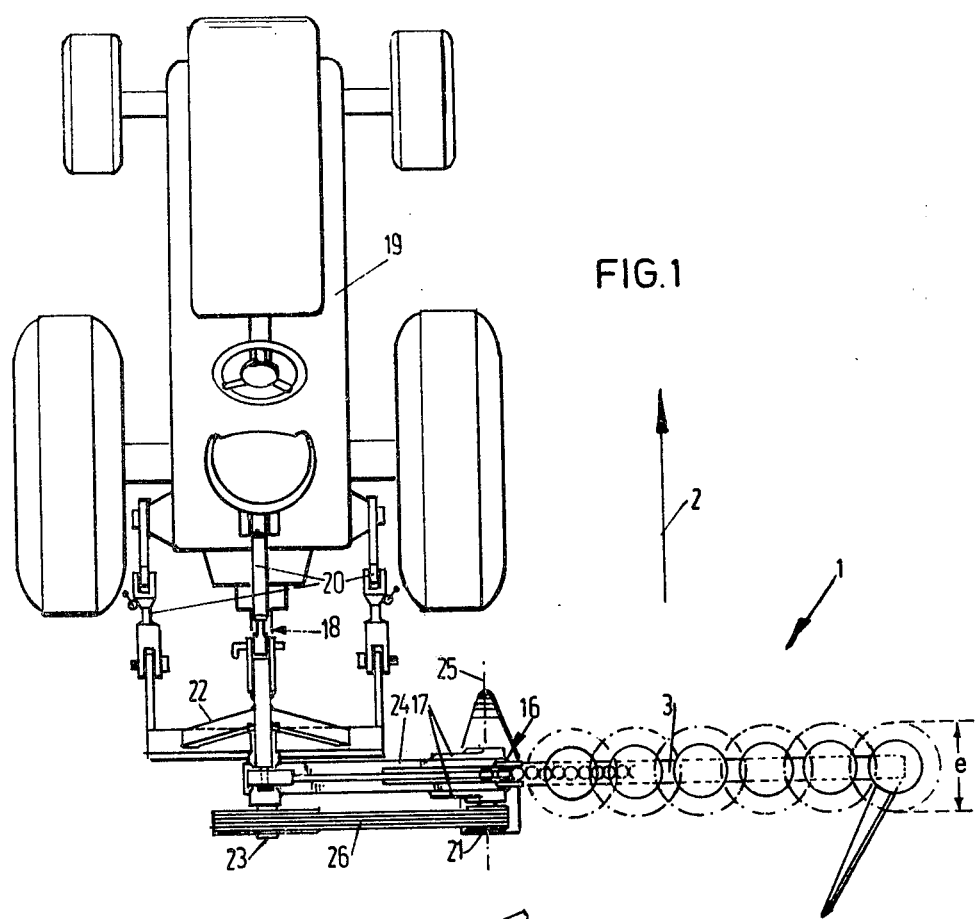

United States Patent [19]

Oosterling et al.

[11] 4,345,420
[45] Aug. 24, 1982

[54] MOWING IMPLEMENT

[75] Inventors: Pieter A. Oosterling; Hendricus C. van Staveren, both of Nieuw-Vennep, Netherlands

[73] Assignee: Multinorm, B.V., Nieuw-Vennep, Netherlands

[21] Appl. No.: 91,167

[22] Filed: Nov. 5, 1979

Related U.S. Application Data

[63] Continuation of Ser. No. 832,740, Sep. 12, 1977, abandoned, which is a continuation of Ser. No. 769,775, Feb. 17, 1977, abandoned, which is a continuation of Ser. No. 706,952, Jul. 20, 1976, abandoned, which is a continuation of Ser. No. 536,740, Dec. 27, 1974, abandoned.

[51] Int. Cl.³ .................... A01D 55/22; A01D 35/264
[52] U.S. Cl. ........................................ 56/295; 56/192
[58] Field of Search ............... 56/192, 295, 255, 6, 56/17.4

[56] References Cited

U.S. PATENT DOCUMENTS

| | | | |
|---|---|---|---|
| 1,915,249 | 6/1933 | Jorgensen | 24/208 A |
| 2,815,631 | 12/1957 | Northcote et al. | 56/320.2 |
| 2,898,725 | 8/1959 | Roesel | 56/295 |
| 3,012,269 | 11/1961 | Maguire | 56/295 |
| 3,019,501 | 2/1962 | Kraus et al. | 24/213 R |
| 3,247,656 | 4/1966 | Phelps | 56/295 |
| 3,469,378 | 9/1969 | Heesters et al. | 56/295 |
| 3,500,622 | 3/1970 | Bower | 56/295 |
| 3,507,104 | 4/1970 | Kline et al. | 56/295 |
| 3,643,408 | 2/1972 | Kulak et al. | 56/17.4 |
| 3,662,529 | 5/1972 | Glunk et al. | 56/295 |

*Primary Examiner*—Paul J. Hirsch
*Attorney, Agent, or Firm*—Diller, Ramik & Wight

[57] ABSTRACT

In a mowing implement comprising a housing and a number of cutting members rotatably journalled on said housing the danger of damage of the implement due to stones jammed between a cutting member and said housing is avoided in that each cutter is fastened to the top side of a holder skimming the top side of the housing.

2 Claims, 17 Drawing Figures

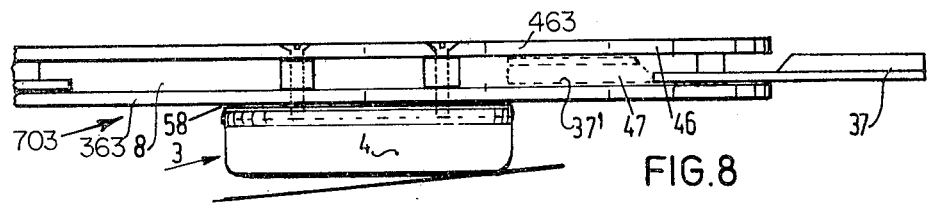
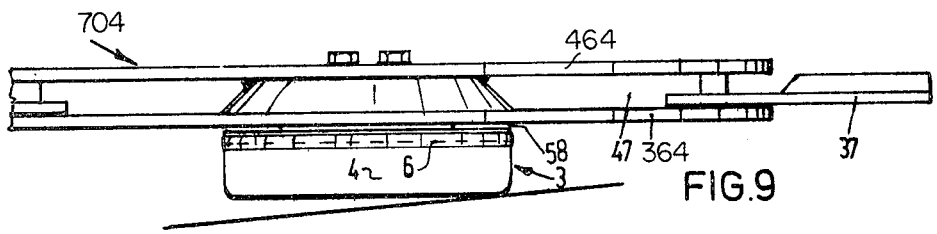
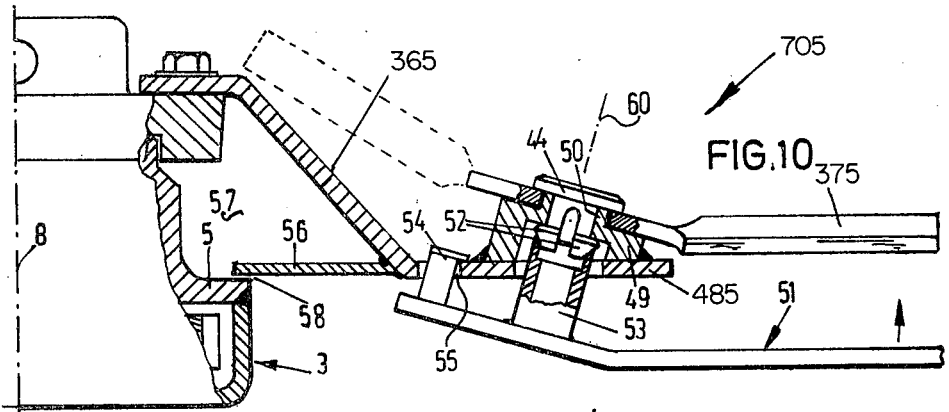
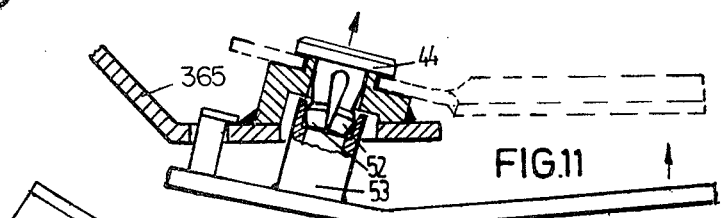
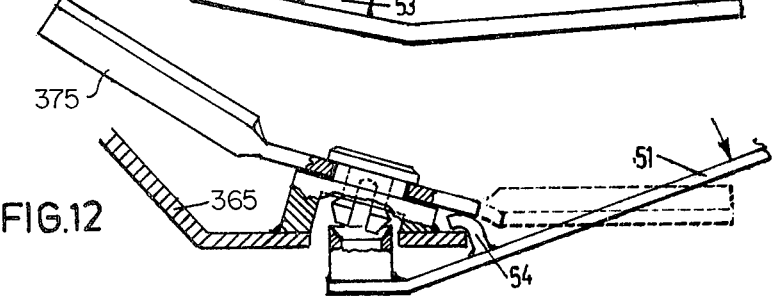

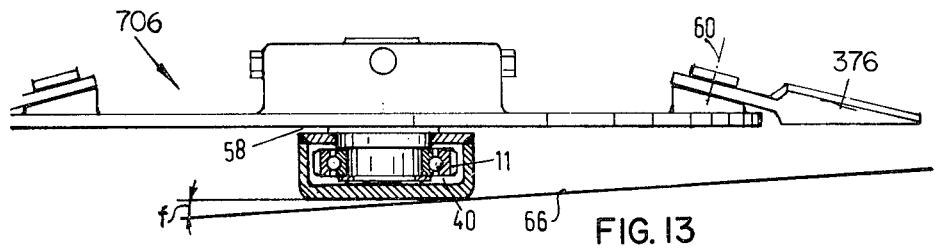
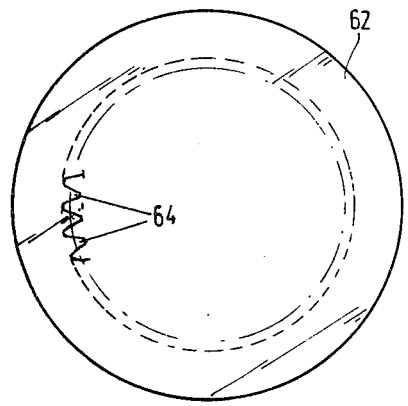
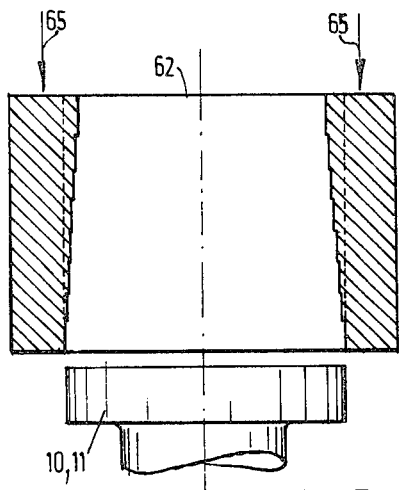
FIG. 14  FIG. 15
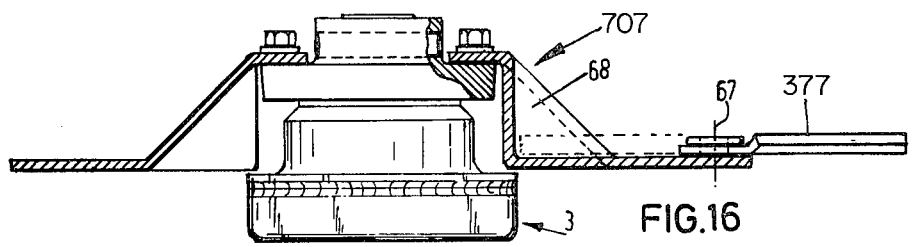
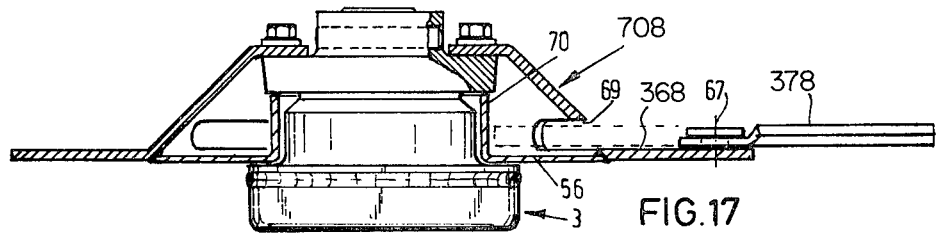

MOWING IMPLEMENT

This is a continuation of application Ser. No. 832,740, filed Sept. 12, 1977 now abandoned, which is Rule 60 continuation of Ser. No. 769,775 filed Feb. 17, 1977 and now abandoned which is Rule 60 continuation of Ser. No. 706,952 filed July 20, 1976 and now abandoned which is a Rule 60 continuation of parent application Ser. No. 536,740 filed Dec. 27, 1974 and now abandoned.

The invention relates to a mowing implement comprising a housing extending transversely of the direction of travel of the mowing implement, a plurality of cutting members rotatably journalled on said housing and a driving gear arranged inside said housing, each cutting member comprising at least one holder and at least one cutter fastened to the periphery of the holder.

Such a mowing implement is known. On the lower side of each holder constructed in the form of a disc a screen is arranged on the front side of the housing in order to prevent stones from being jammed between the holder and the housing and from seriously damaging the mowing implement.

The invention has for its object to provide a simple mowing device in which the risk of damage of the mowing implement due to stones jammed between a holder and the housing is avoided.

The mowing implement of the kind set forth is improved in accordance with the invention by fastening each cutter to the top side of a holder skimming the top side of the housing. Since the holder skims the top side of the housing, a narrow gap is left between the holder and the housing, which will be a barrier for stones. The top surface of the cutting member serves as a guide surface for the cut crop. Experiments have shown that the fastening pin of the cutter does not appreciably hinder the forward movement of the mowing implement with respect to the cut crop. Preferably each cutter is adapted to turn freely over the top surface of the holder about a fastening pin of the relevant cutting member. If desired, a cover plate may be arranged above said holder to serve as a guide surface for the cut crop. In this case the cutter is freely rotatable in the gap between the holder and the cover plate.

However, it is preferred not to use a cover plate so that each cutter can freely turn over the top surface of the cutting member.

If the cutter is adapted to turn about an upward, outwardly inclined axis of the cutting member, the latter may be shaped in the form of a hat and/or the cutter may be long and be secured to a low rim. Then the cutter can turn upwardly without touching the upright portion.

If the cutter is fastened to the holder by means of a resilient fastening member, which is split in its longitudinal direction the cutter can be replaced readily.

The aforesaid and further features of the invention will become apparent from the following description of preferred embodiments of a mowing implement in accordance with the invention.

Figure 2:
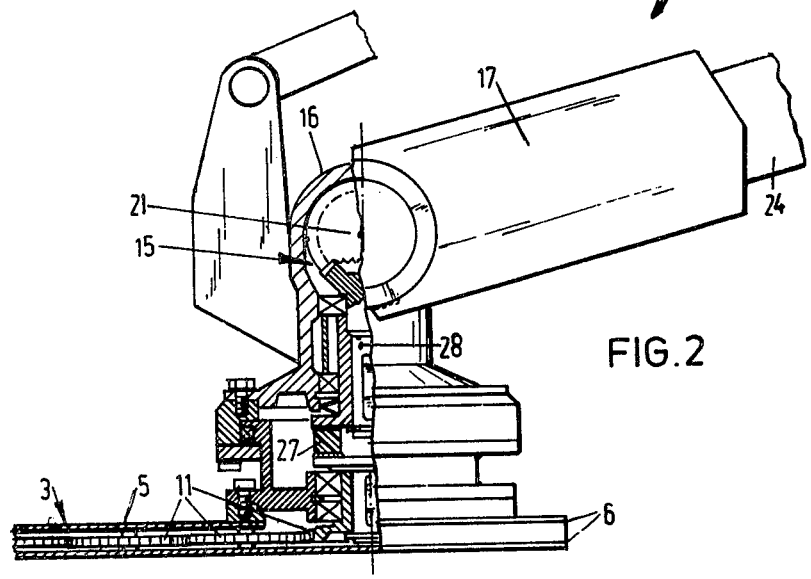
Figure 3:
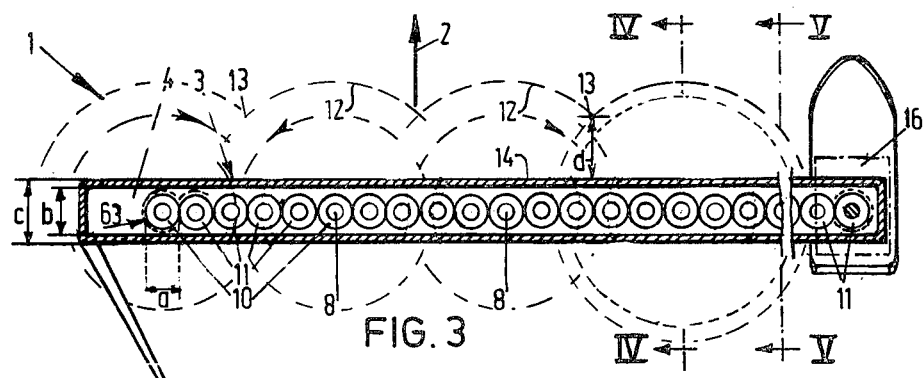
Figure 4:
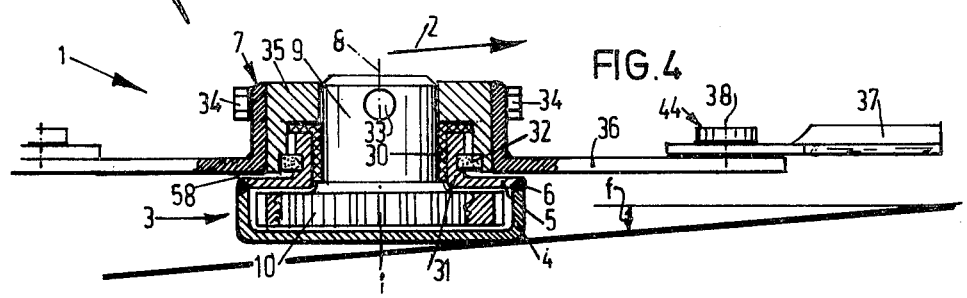
Figure 5:
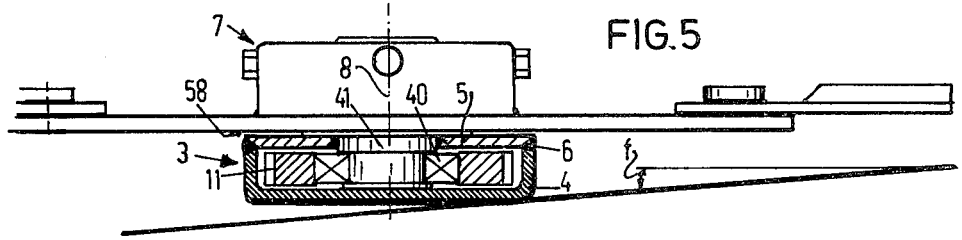
Figure 6:
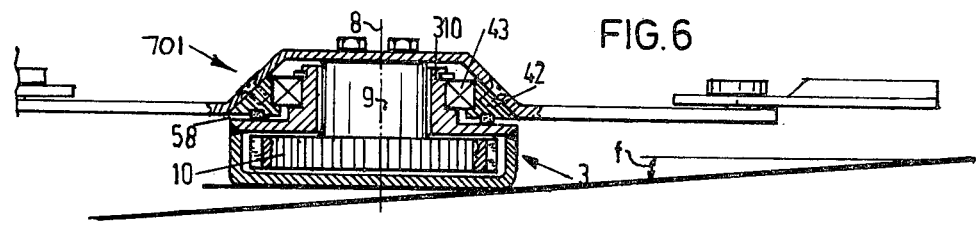
Figure 7:
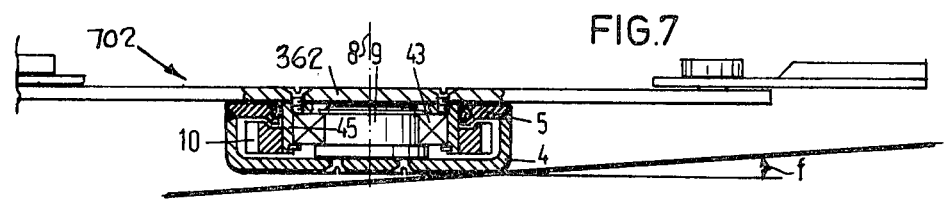

In the drawings:

FIG. 1 is a plan view of a tractor with a mowing implement embodying the invention, FIG. 2 is a front view, partly broken away, of the mowing implement on an enlarged scale, FIG. 3 is a horizontal sectional view of the housing of the driving gear of the mowing implement shown in FIG. 1, FIG. 4 is a sectional view taken on the line IV—IV is FIG. 3, FIG. 5 is a sectional view taken on the line V—V in FIG. 3, FIGS. 6 and 7 are sectional views like FIG. 4 of respective different embodiments of the implement in accordance with the invention, FIGS. 8 and 9 are elevational views of a detail like FIG. 4 of different embodiments of an implement in accordance with the invention, FIG. 10 is an enlarged, elevational view, partly broken away, of a different mowing implement in accordance with the invention in conjunction with a wrench for dismounting knives, FIG. 11 shows a detail of FIG. 10 in a different position, FIG. 12 shows a variant of the detail of FIG. 11, FIG. 13 is a sectional view like FIG. 5, associated with FIG. 15, FIGS. 14 and 15 show schematically a rifling milling cutter for the manufacture of gear wheels, and FIGS. 16 and 17 are elevational views, broken away, of a cutting member of different embodiments of the implement in accordance with the invention.

As shown in FIG. 1 the mowing implement 1 is connected with a frame 22 suspended by the lifting rods 20 of a tractor 19, in which frame 22 is journalled a driving shaft 23 driven by the power take-off shaft of the tractor 19, energized by the universal shaft 18. An auxiliary frame 24 is adapted to turn about the horizontal shaft 23 with respect to the frame 22. The auxiliary frame 24 is provided at its other end with two ears 17, which define a horizontal centre line 25 and coaxially to a housing 16 of a bevel gear drive 15. The input shaft 21 of this driving bevel gear 15 is also coaxial to the centre line 25. The shaft 21 is driven through a belt transmission 26 from the driving shaft 23.

The mowing implement 1 according to the invention comprises a housing 3, extending transversely of the direction of movement 2 and shaped in the form of a flat, elongated beam essentially formed by a channel-shaped bottom 4, to which a lid 5 is secured by welds 6. On the housing 3 a plurality of mowing members 7 are rotatably journalled on upright shafts 9. The cutting members 7 are arranged near and above the housing 3 and are adapted to rotate pairwise in opposite senses. Each cutting member 7 is rigidly secured by means of a shaft 9 to a driving gear 10 of a driving gear means 63 accommodated in the housing 3 and comprised of a series of gears i.e. said gears 10 and intermediate gears 11. The intermediate 11 nearest the tractor 19 is driven through an elastic coupling 27 and a shaft 28 by the bevel gear drive 15.

Between each pair of gears 10 rotating in opposite senses towards one another four or two pairs of intermediate gears 11 are arranged, each of which is identical with a gear 10. Owing to the large number of intermediate gears 11 the pitch diameter a is small, for example, 80 mms. Therefore, the required internal width b of the housing is small, for example, 100 mms. It is even possible to arrange three pairs of intermediate gears 11 between two gear wheels 10. Since the lid 5 and the trough 4 are welded to one another—instead of being screwed together by flanges of the housing 3—the external width c is particularly small, for example, 110 mms. As a result the points of intersection 13 of the mowing circles 12 are located at a large distance d, for example, 120 mms, in front of the uninterrupted, straight front edge 14 of the housing 3. FIG. 4 shows that the shaft 9 of each cutting member 7 is rotatably journalled in an upright collar 31 of the lid 5 by means of a bearing 30 in the form of a sliding bearing. Moreover, a seal 32 is provided between the cutting member 7 connected with the shaft 9 by means of a transverse pin 33 and the collar 31.

Each cutting member 7 comprises a disc 36, fastened by screws 34 to a hub 35, which disc forms a holder for one or more, for example, two cutters 37. The cutters 37 move across adjacent discs 36 without touching the same (FIG. 1). The cutters 37 of adjacent mowing members 7 are relatively off-set through an angle of 90° so that they do not touch one another, although the paths of the cutters 37 overlap one another. Each cutter 37 is freely rotatable about a pin 38, which is secured to the disc 36 by a longitudinally split, resilient fastening member 44 shown in FIG. 10. The right-hand side of FIG. 4 shows the cutter 37, which is capable of rotating along a circle 39 in FIG. 3 upon collision with a stone with respect to the disc 36 without abutting against any part of the housing 3 or a disc 36.

FIG. 5 shows the arrangement of a intermediate gear 11 by means of a roll bearing 40 around a shaft 41 welded to the lid 5.

After the driving gear means 63 has been mounted in the trough or channel 4 and the lid 5 has been welded on the housing 3 neither the intermediate gears 11 nor the driving gears 10 are any longer accessible for being removed therefrom. If in operation the driving gear means 63 is damaged, for example, due to a break-down of a tooth of a gear 10 or 11, the housing 3 is disengaged from the cutting members 7 and from the auxiliary frame 24 and is replaced by a new housing 3, which constitutes a repair unit.

FIG. 6 shows as a variant of FIG. 4 that the cutting member 701 is journalled by means of a ring 42 and a roll bearing 43 on the outer side of the collar 31 on the housing 3.

The cutting member 702 of FIG. 7 comprises a holder in the form of a completely flat disc 362 and a ring 45 secured to the bottom side thereof and fastened by press fit in a gear 10 and journalled by means of a roll bearing 43 on a shaft 9 secured to the trough 4.

The cutting member 703 of FIG. 8 is similar to that shown in FIG. 7, but it is provided with a cover plate 46 so that the cutters 37 can rotate in the space 47 between the cover plate 463 and the disc 363.

In the cutting member 704 of FIG. 9 a similar space 47 is provided between the cover plate 464 and the disc 364.

Referring to FIG. 10 the holder of the cutting member 705 is formed by a hat-like disc 365 having a horizontal rim 485, to which struts 49 are welded. Each cutter 375 is adapted to turn about a collar 50 of the strut 49 by means of a resilient fastening member 44, which can be disengaged by a special key 51 by bending inwardly hooks 52 in a sleeve 53 of the key 51 and by subsequently pulling up the fastening member 44. The key 51 comprises a hook 54 engaging a recess 55 of the disc 365 (see FIG. 11).

Referring to FIG. 12 a hook 54 of a key 51 can grip around the outer side of the disc 365.

Each cutter 375 of FIG. 10 is bent so that in the position indicated by broken lines in this Figure it does not touch the top side of the disc 36.

FIG. 13 shows a cutting member 706, in which each cutter 376 like in FIG. 10 is capable of turning about an upright, outwardly inclined axis 60. The cutter 376 of FIG. 13 is, however, not kinked.

The cutters shown are all torsioned so that they slightly lift the crop after cutting.

The gear 11 shown in FIG. 13 is formed by teeth out in the outer ring of the roller, needle or ball bearing 40. Thus, if desired, gears 11 of even smaller diameters may be employed.

The gears 10 and 11 are preferably identical. Because these gears are very small and manufactured in large numbers they can advantageously be manufactured by means of a rifling milling cutter 62 having internal toothing 64 (see FIGS. 14 and 15). The milling cutter 62 is then moved in the direction of the arrow 65 with respect to the gears 10, 11 to be produced.

In the plane of the rim 485, inside the disc 365 of FIG. 10, a sealing plate 56 is welded, which moves just past the lid 5 and which protects the space 57 from stones.

The embodiments of all FIGS. 4 to 13 have a gap 58 between the rotating cutting members and the non-rotating housing 3 to prevent the entry of stones therebetween.

In all embodiments shown the mowing implement 1 has a low structure and the cutting members are shaped so that the mowing implement 1 readily moves beneath the cut crop. The circumferential speed of the cutters is very high, for example, about 80 ms/sec with a circumferential diameter e (see FIG. 1) of 45 to 50 cms.

In operation the mowing implement 1 is held slightly inclined forwardly so that the cutting members are at an angle f to the land level 66.

The cutters 377 and 378 of the cutting members 701 and 702 of FIGS. 16 and 17 are adapted to turn each about a vertical axis 67. In order to permit each cutter 377 to turn about the axis 67 a local depression 68 (FIG. 16) is provided, whilst as shown in FIG. 17 an opening 69 is provided in the disc 368. The cover plate 56 shown in FIG. 17 has an upright rim 70, which retains any stones penetrating through the opening 69.

What we claim is:

1. A mowing implement comprising, in combination:
an elongate housing of generally rectangular cross section adapted to extend in a direction of movement of the mowing implement, said housing being of predetermined narrow width and of predetermined small thickness whereby to pass over the ground with its top wall angled slightly downwardly but still spaced closely thereabove;
a train of gears disposed in serially meshing relation within said housing, each gear being of a diameter less than said predetermined narrow width of the housing and of a thickness less than said small thickness of the housing;
a shaft connected to that gear at said one end of the housing and a plurality of further shafts connected to other gears of said train of gears, each shaft projecting upwardly through the top wall of said housing;
a holder connected to each shaft and including a first disc having a flat portion and a dished central portion, said flat portion closely overlying the top wall of said housing and projecting beyond the front edge of the housing whereby to present a very small gap between such portion and top wall of the housing at the front edge thereof so as to preclude the entry of potentially damaging foreign objects between said holder and said housing, each holder including a second disc connected to the dished central portion of said first disc, each second disc being flat throughout and being connected in registry with its first disc so that the peripheries of the two discs are in vertically spaced relation; and a cutter pivotally connected to each holder between said first and second disc adjacent the periphery thereof and projecting therefrom to sweep a circular path which is larger than the circular path swept by its holder, the circular paths swept by cutter members of adjacent holders overlapping well forward of said front edge of the housing but such cutter members being rotationally staggered with respect to each other so as to prevent interference therebetween.

2. A mowing implement comprising, in combination:

an elongate housing of generally rectangular cross section adapted to extend in a direction transverse to the direction of movement of the mowing implement and having a flat upper surface;

a train of gears disposed in serially meshing relation within said housing from one end thereof to the other;

a shaft connected to that gear at said one end of the housing and a plurality of further shafts connected to other gears of said train of gears, there being a plurality of gears between each adjacent pair of gears to which said shafts are connected; and cutter means on each of said shafts for cutting an upstanding crop, each cutter means comprising an upper and a lower plate member each rigidly affixed to a corresponding one of said shafts to sweep a circular path, the circular paths of adjacent cutter means being non-overlapping and each lower plate including an outer margin which projects radially beyond the forward edge of said housing and sweeps over said upper surface of the housing in closely spaced relation thereto, each upper plate being registered vertically with respect to its lower plate, at least one pin projecting between each set of upper and lower plates adjacent the peripheries thereof, and a cutter member pivotally mounted on each pin, each cutter member projecting radially beyond its plates to sweep a circular path such that the paths of adjacent cutter members overlap beyond said front edge of the housing, the cutter members of adjacent cutter means being staggered so that adjacent cutter members do not interfere with each other, the lower plate of each cutter member including an upwardly dished central region, each upper plate engaging an upwardly dished central region of a lower plate.

* * * * *